Nov. 13, 1934.  E. E. HEWITT ET AL  1,980,335
GASKET CONSTRUCTION
Filed Aug. 25, 1932
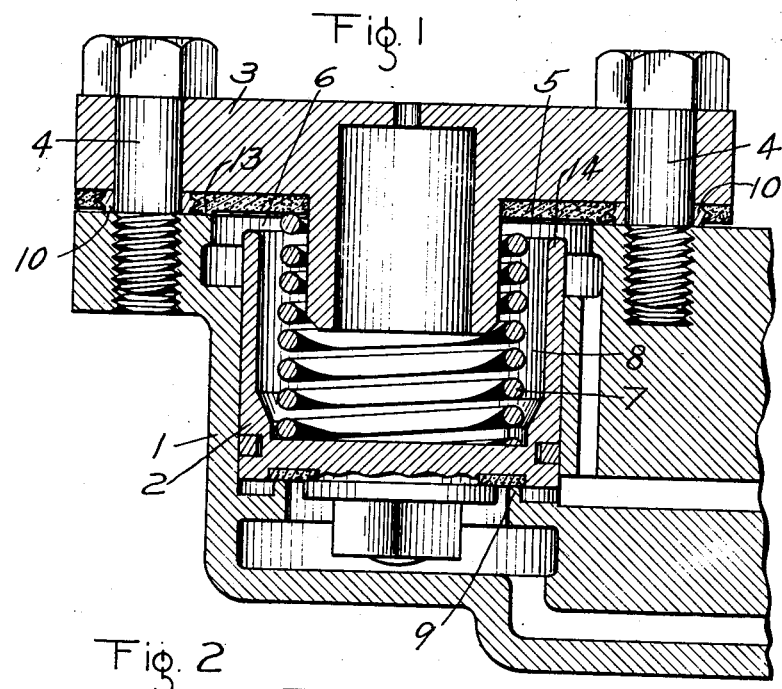
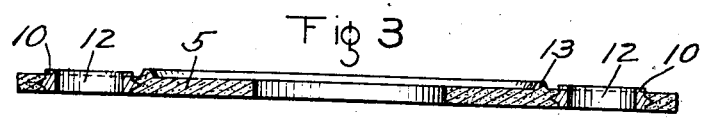
INVENTORS.
ELLIS E. HEWITT
EWING K. LYNN
By
Wm. H. Cady
ATTORNEY.

Patented Nov. 13, 1934

1,980,335

UNITED STATES PATENT OFFICE 1,980,335

GASKET CONSTRUCTION

Ellis E. Hewitt, Edgewood, and Ewing K. Lynn, East McKeesport, Pa., assignors to The Westinghouse Air Brake Company, Wilmerding, Pa., a corporation of Pennsylvania Application August 25, 1932, Serial No. 630,364

3 Claims. (Cl. 288—1)

This invention relates to gaskets for sealing chambers to prevent leakage of fluid under pressure, and more particularly to a gasket adapted to be associated with a valve or piston device.

The successful operation of a valve or piston device may be dependent upon the accurate fixing of the degree of initial compression of a spring.

In valve devices having a sealing gasket, where a valve or piston is subject to the pressure of a spring and the spring bears at one end on the gasket, the initial compression of the spring may vary, due to the uneven compression of the gasket, when the parts are clamped together.

Also, where a valve member is arranged to seat on a gasket, it is desirable that the gasket be uniformly compressed in order that the valve member will seat uniformly on the gasket, so as to prevent leakage of fluid under pressure, whereas, with the usual gasket construction, unless the clamping bolts are very carefully and uniformly screwed down, the gasket will be unevenly compressed, so that a valve member will not seat uniformly on the gasket.

The principal object of our invention is to provide an improved gasket construction which will ensure the uniform compression of the gasket, and thus will avoid the difficulties above referred to.

In the accompanying drawing; Fig. 1 is a sectional view of a valve device, showing a gasket associated therewith and embodying our improvement; Fig. 2 an enlarged sectional view of a portion of the valve device shown in Fig. 1; and Fig. 3, a sectional view of the improved gasket.

In order to illustrate one application of the improved gasket, a valve device is shown in Fig. 1 comprising a casing 1 having a cylindrical bore, in which is mounted a valve piston 2. The open end of the bore may be closed by a cover plate 3, which may be secured to the casing 1 by a plurality of clamping bolts 4.

Interposed between the clamping faces of the casing 1 and the cover plate 3 is our improved gasket 5. The gasket 5 prevents leakage of fluid from the chamber 6 at one side of the valve piston 2 and serves as a seat for one end of a coil spring 7, which extends into a bore 8, provided in the valve piston 2, and which urges the valve piston 2 into engagement with an annnular seat rib 9.

According to our invention, the gasket 5 is provided with metal inserts 10, preferably brass, which may be moulded or otherwise secured in the gasket and which are preferably provided with an annular rib portion 11 to hold the inserts securely within the gasket.

The inserts 10 are provided with openings 12 adapted to receive the securing bolts 4.

Concentric with the chamber 6, the gasket 5 is provided with a sealing rib 13 to prevent leakage past the gasket. Similar ribs are provided for other chambers, if the valve device is provided with a plurality of chambers.

The rib 13 extends slightly below the faces of the inserts 10, so as to permit the ribs to be compressed, before the faces of the inserts are engaged by the casing 1. The faces of the inserts 10 are also disposed a slight distance above the flat face of the gasket, so that when the cover plate 3 is clamped to the casing 1, the clamping pressure, is taken by the inserts, and the gasket is thus not compressed, when the parts are secured together. The rib 13, however, is compressed sufficiently to prevent leakage of fluid under pressure past the gasket.

Since the gasket proper is not compressed, and since the inserts 10 act as spacers to ensure uniform compression of the rib 13, the initial compression of the spring 7 will be uniform, and where the gasket acts as a seat for a valve member, such as due to the engagement of the seat rib 14 of the valve piston 2 with the gasket, an even and uniform engagement of the seating member on the gasket will be provided.

The gasket 5 is made of yielding flexible material, such as rubber composition, in which the inserts 10 are moulded or otherwise secured.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. A resilient gasket having a plurality of metal inserts secured therein to prevent compression of the gasket proper, and an unconfined rib on one face of the gasket which extends slightly above the faces of the inserts to prevent compression of the rib.

2. A resilient gasket having a plurality of metal inserts secured therein, the faces of the inserts at one side of the gasket extending slightly above the face of the gasket to prevent compression of the gasket proper, and a sealing rib formed on the gasket which extends slightly above the faces of the insert, to permit compression of the rib.

3. A flat gasket composed of flexible material and a plurality of metal inserts secured on said gasket and of greater thickness than the gasket to prevent compression of the gasket proper, said inserts having openings to receive securing means and a sealing rib formed on the gasket and extending slightly above the faces of the inserts to permit compression of the rib.

ELLIS E. HEWITT.
EWING K. LYNN.

CERTIFICATE OF CORRECTION.

Patent No. 1,980,335. November 13, 1934.

ELLIS E. HEWITT, ET AL.

It is hereby certified that error appears in the printed specification of the above numbered patent requiring correction as follows: Page 1, line 102, claim 1, for "prevent" read permit; and that the said Letters Patent should be read with this correction therein that the same may conform to the record of the case in the Patent Office.

Signed and sealed this 8th day of January, A. D. 1935.

Leslie Frazer (Seal)

Acting Commissioner of Patents.